US010223622B2

(12) United States Patent
Miyazawa et al.

(10) Patent No.: US 10,223,622 B2
(45) Date of Patent: Mar. 5, 2019

(54) CARD READER (71) Applicant: NIDEC SANKYO CORPORATION, Suwa-gun Nagano (JP)

(72) Inventors: Shinya Miyazawa, Nagano (JP); Mamoru Mizawa, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 15/750,889

(22) PCT Filed: Aug. 3, 2016

(86) PCT No.: PCT/JP2016/072759
§ 371 (c)(1),
(2) Date: Feb. 7, 2018

(87) PCT Pub. No.: WO2017/026342
PCT Pub. Date: Feb. 16, 2017

(65) Prior Publication Data
US 2018/0232609 A1 Aug. 16, 2018

Related U.S. Application Data (60) Provisional application No. 62/202,458, filed on Aug. 7, 2015.

(30) Foreign Application Priority Data

Sep. 30, 2015 (JP) ................................ 2015-192658

(51) Int. Cl.
G06K 13/05 (2006.01)
B65H 5/06 (2006.01)
(Continued)

(52) U.S. Cl.
CPC .............. *G06K 13/05* (2013.01); *B65H 5/06* (2013.01); *B65H 5/062* (2013.01); *G06K 7/003* (2013.01);
(Continued)

(58) Field of Classification Search
CPC .. B65H 5/06; B65H 3/0669; B65H 2403/722; B65H 2403/80; B65H 2403/00;
(Continued)

(56) References Cited

U.S. PATENT DOCUMENTS 4,019,025 A 4/1977 Taniguchi et al.
4,358,103 A 11/1982 Koike et al.
(Continued)

FOREIGN PATENT DOCUMENTS

JP S63244188 A 10/1988
JP H07175896 A 7/1995
(Continued)

OTHER PUBLICATIONS

International Search Report corresponding to Application No. PCT/JP2016/072759; dated Oct. 11, 2016.
(Continued)

Primary Examiner — Christopher Stanford
(74) Attorney, Agent, or Firm — Cantor Colburn LLP (57) ABSTRACT A card reader may include a card conveying passage; and a card conveying mechanism. The card conveying mechanism may include a motor; a conveying roller; and a power transmission mechanism. The power transmission mechanism may include a first gear, a second gear, a third gear, a fourth gear, a first support shaft structured to support the first gear and the third gear in a rotatable manner; and a second support shaft structured to support the second gear and the fourth gear in a rotatable manner. An axial direction of the first support shaft coincides with the first direction, and an
(Continued)

axial direction of the second support shaft coincides with the first direction. The first gear and third gear overlap each other in the axial direction of the first support shaft, and the second gear and fourth gear overlap each other in the axial direction of the second support shaft.

10 Claims, 7 Drawing Sheets

(51) Int. Cl.
  *G06K 13/06* (2006.01)
  *G06K 7/00* (2006.01)
  *G06K 7/08* (2006.01)
  *G06K 7/015* (2006.01)

(52) U.S. Cl.
  CPC ............ *G06K 7/087* (2013.01); *G06K 13/06* (2013.01); *B65H 2403/80* (2013.01); *B65H 2403/92* (2013.01); *B65H 2601/523* (2013.01); *B65H 2701/1914* (2013.01); *G06K 7/015* (2013.01)

(58) Field of Classification Search
  CPC .......... B65H 2403/50; G03G 15/6529; G03G 2215/00679; B41J 13/0009; H04N 1/00602; G06K 13/06; G06K 13/00
  See application file for complete search history.

(56) References Cited

U.S. PATENT DOCUMENTS

| | | | |
|---|---|---|---|
| 6,011,570 A | 1/2000 | Muranaka et al. | |
| 6,021,948 A * | 2/2000 | Tsai | G06K 7/0004 |
| | | | 235/440 |
| 6,152,620 A | 11/2000 | Ozawa et al. | |
| 6,422,468 B1 | 7/2002 | Nishizawa et al. | |
| 9,340,104 B2 * | 5/2016 | Kanatani | B60K 7/0007 |
| 9,493,064 B2 * | 11/2016 | Kanatani | B60K 7/0007 |
| 9,884,549 B2 * | 2/2018 | Kanatani | B60K 7/0007 |
| 2004/0124575 A1 * | 7/2004 | Lee | B65H 3/08 |
| | | | 271/10.01 |
| 2005/0178226 A1 * | 8/2005 | Suzuki | F16H 1/20 |
| | | | 74/414 |
| 2011/0000965 A1 | 1/2011 | Hirabayashi et al. | |
| 2011/0180985 A1 * | 7/2011 | Yamamoto | B65H 3/0607 |
| | | | 271/117 |
| 2012/0002313 A1 | 1/2012 | Miyabe et al. | |

FOREIGN PATENT DOCUMENTS

| | | |
|---|---|---|
| JP | H1087089 A | 4/1998 |
| JP | 2010159140 A | 7/2010 |
| JP | 2015014842 A | 1/2015 |

OTHER PUBLICATIONS

USPTO Non-Final Office Action corresponding to U.S. Appl. No. 15/750,882; dated Sep. 18, 2018.

* cited by examiner

CARD READER

CROSS REFERENCE TO RELATED APPLICATIONS

This is the U.S. national stage of application No. PCT/JP2016/072759, filed on Aug. 3, 2016. Priority under 35 U.S.C. § 119 (a) and 35 U.S.C. § 365(b) is claimed from Japanese Applications No. 2015-192865192658, filed Sep. 30, 2015. Priority under 35 U.S.C. § 119(e) is claimed from U.S. Provisional Application No. 62/202,458, filed Aug. 7, 2015, the disclosure of which is incorporated herein by reference.

TECHNICAL FIELD

At least an embodiment of the present invention relates to a card reader including a card conveying mechanism structured to convey a card along a card conveying passage.

BACKGROUND

Conventionally, a card reader has been known, which includes a card conveying mechanism structured to convey a card along a card conveying passage (see, for example, Patent Literature 1). In a card reader described in Patent Literature 1, a card conveying mechanism includes: a conveying roller structured to convey a card; a motor; an input-side gear fixed to a rotation shaft of the motor; an output-side gear fixed to a rotation shaft to which the conveying roller is fixed; and two reduction gears disposed between the input-side gear and the output-side gear. Each of the reduction gears includes a large gear part that is disposed on an input side of power to be transmitted from the motor, and a small gear part that is disposed on an output side of power to be transmitted from the motor and is smaller in pitch diameter than the large gear part. The large gear part and the small gear part are coaxially disposed with each other. Further, the two reduction gears are disposed to be adjacent to each other in a conveying direction of the card.

CITATION LIST

Patent Literature 1: Japanese Patent Laid-Open No. Sho 63-244188

In order to downsize the card reader described in Patent Literature 1, a compact motor may be used as the motor of the card conveying mechanism. On the other hand, the use of a compact motor causes a reduction in torque of the motor, which may result in degradation in force to convey a card. If the torque of the motor is reduced, the degradation in force to convey the card can be suppressed by increasing a reduction ratio between the motor and the conveying roller.

In the card reader described in Patent Literature 1, however, multiple reduction gears are arranged in the conveying direction of the card in order to increase the reduction ratio between the motor and the conveying roller. In this card reader, consequently, increasing the reduction ratio between the motor and the conveying roller causes upsizing of the card reader in the conveying direction of the card. In the card reader described in Patent Literature 1, the reduction ratio between the motor and the conveying roller may also be increased as follows. That is, a reduction ratio between the reduction gears is increased by increasing a pitch diameter of the large gear part of each reduction gear. In this case, however, the increase in pitch diameter of each large gear part may cause upsizing of the card reader in the conveying direction of the card and may also cause upsizing of the card reader in a thickness direction of the card to be conveyed along the card conveying passage.

Therefore, in view of the problem described above, at least an embodiment of the present invention provides a card reader that can be downsized in a conveying direction of a card to be conveyed along a card conveying passage even when a reduction ratio between a motor and a card conveying roller each structuring a card conveying mechanism is increased.

To achieve the above, at least an embodiment of the present invention provides a card reader including: a card conveying passage where a card is conveyed; and a card conveying mechanism structured to convey the card along the card conveying passage. The card conveying mechanism includes: a motor structured to serve as a drive source; a conveying roller structured to contact with the card to convey the card; and a power transmission mechanism structured to reduce power of the motor to transmit the reduced power to the conveying roller. The power transmission mechanism includes: a first gear having a first large gear part, and a first small gear part that is smaller in pitch diameter than the first large gear part and is coaxially disposed with the first large gear part; a second gear having a second large gear part that is larger in pitch diameter than the first small gear part and is engaged with the first small gear part, and a second small gear part that is smaller in pitch diameter than the second large gear part and is coaxially disposed with the second large gear part; a third gear having a third large gear part that is larger in pitch diameter than the second small gear part and is engaged with the second small gear part, and a third small gear part that is smaller in pitch diameter than the third large gear part and is coaxially disposed with the third large gear part; a fourth gear having a fourth large gear part that is larger in pitch diameter than the third small gear part and is engaged with the third small gear part, and a fourth small gear part that is smaller in pitch diameter than the fourth large gear part and is coaxially disposed with the fourth large gear part; a first support shaft structured to support the first gear and the third gear in a rotatable manner; and a second support shaft structured to support the second gear and the fourth gear in a rotatable manner. Herein, a direction perpendicular to a thickness direction of the card to be conveyed along the card conveying passage and a conveying direction of the card is referred to as a first direction. The first support shaft is disposed so that an axial direction of the first support shaft is coincided with the first direction, and the second support shaft is disposed so that an axial direction of the second support shaft is coincided with the first direction. The first gear and the third gear are disposed to overlap each other in the axial direction of the first support shaft, and the second gear and the fourth gear are disposed to overlap each other in the axial direction of the second support shaft.

In the card reader according to at least an embodiment of the present invention, the direction perpendicular to the thickness direction of the card to be conveyed along the card conveying passage and the conveying direction of the card is referred to as the first direction. In this case, the first support shaft is disposed so that the axial direction of the first support shaft is coincided with the first direction, and the second support shaft is disposed so that the axial direction of the second support shaft is coincided with the first direction. Further, the first gear and the third gear are rotatably supported by the first support shaft so as to overlap each other in the axial direction of the first support shaft, and the second gear and the fourth gear are rotatably supported by the second support shaft so as to overlap each other in the axial direction of the second support shaft. In at least an embodiment of the present invention, therefore, the power transmission mechanism can be structured of at least four reduction gears even when the number of support shafts for the reduction gears to be arranged in the conveying direction of the card is reduced. In at least an embodiment of the present invention, in other words, the number of reduction gears structuring the power transmission mechanism can be increased even when the number of support shafts for the reduction gears to be arranged in the conveying direction of the card is reduced. In at least an embodiment of the present invention, further, since the number of reduction gears can be increased, a reduction ratio between the motor and the conveying roller can be increased even when the pitch diameter of each of the first large gear part, the second large gear part, the third large gear part, and the fourth large gear part is decreased.

In at least an embodiment of the present invention, as described above, the reduction ratio between the motor and the conveying roller can be increased even when the number of support shafts for the reduction gears to be arranged in the conveying direction of the card is reduced and even when the pitch diameter of each of the first large gear part, the second large gear part, the third large gear part, and the fourth large gear part is decreased. In at least an embodiment of the present invention, accordingly, the card reader can be downsized in the conveying direction of the card even when the reduction ratio between the motor and the conveying roller is increased.

In at least an embodiment of the present invention, the first gear, the second gear, the third gear, and the fourth gear are formed to be equal in shape to one another. With this structure, the first gear, the second gear, the third gear, and the fourth gear are common components. It is therefore possible to reduce manufacturing costs of the first gear, the second gear, the third gear, and the fourth gear. It is also possible to facilitate components management of the first gear, the second gear, the third gear, and the fourth gear.

In at least an embodiment of the present invention, the card conveying mechanism includes an input-side gear fixed to an output shaft of the motor. Also, the power transmission mechanism includes a first idle gear engaged with the input-side gear and engaged with the first large gear part. With this structure, a position where the motor is disposed in the conveying direction of the card can be adjusted using the first idle gear. It is therefore possible to enhance the degree of freedom concerning the position where the motor is disposed in the conveying direction of the card.

In at least an embodiment of the present invention, the card conveying mechanism includes: a second conveying roller disposed in a separated state with a distance between the second conveying roller and the conveying roller in the conveying direction of the card, and structured to contact with the card to convey the card; and a second power transmission mechanism structured to reduce power of the motor to transmit the reduced power to the second conveying roller. Also, the motor has an output shaft disposed between the power transmission mechanism and the second power transmission mechanism in the conveying direction of the card. With this structure, the card reader can be downsized in the conveying direction of the card even when the card conveying mechanism includes the second conveying roller and the second power transmission mechanism in addition to the conveying roller and the power transmission mechanism.

In at least an embodiment of the present invention, the second power transmission mechanism includes: a fifth gear having a fifth large gear part, and a fifth small gear part that is smaller in pitch diameter than the fifth large gear part and is coaxially disposed with the fifth large gear part; a sixth gear having a sixth large gear part that is larger in pitch diameter than the fifth small gear part and is engaged with the fifth small gear part, and a sixth small gear part that is smaller in pitch diameter than the sixth large gear part and is coaxially disposed with the sixth large gear part; a seventh gear having a seventh large gear part that is larger in pitch diameter than the sixth small gear part and is engaged with the sixth small gear part, and a seventh small gear part that is smaller in pitch diameter than the seventh large gear part and is coaxially disposed with the seventh large gear part; an eighth gear having an eighth large gear part that is larger in pitch diameter than the seventh small gear part and is engaged with the seventh small gear part, and an eighth small gear part that is smaller in pitch diameter than the eighth large gear part and is coaxially disposed with the eighth large gear part; a third support shaft structured to support the fifth gear and the seventh gear in a rotatable manner; and a fourth support shaft structured to support the sixth gear and the eighth gear in a rotatable manner. Also, the third support shaft is disposed so that an axial direction of the third support shaft is coincided with the first direction, and the fourth support shaft is disposed so that an axial direction of the fourth support shaft is coincided with the first direction. Also, the fifth gear and the seventh gear are disposed to overlap each other in the axial direction of the third support shaft, and the sixth gear and the eighth gear are disposed to overlap each other in the axial direction of the fourth support shaft.

With this structure, the second power transmission mechanism can be structured of at least four reduction gears even when the number of support shafts for the reduction gears to be arranged in the conveying direction of the card is reduced. In other words, the number of reduction gears structuring the second power transmission mechanism can be increased even when the number of support shafts for the reduction gears to be arranged in the conveying direction of the card is reduced. Further, since the number of reduction gears structuring the second power transmission mechanism can be increased, a reduction ratio between the motor and the second conveying roller can be increased even when the pitch diameter of each of the fifth large gear part, the sixth large gear part, the seventh large gear part, and the eighth large gear part is decreased. Accordingly, the card reader can be downsized in the conveying direction of the card even when the reduction ratio between the motor and the second conveying roller is increased.

In at least an embodiment of the present invention, the first gear, the second gear, the third gear, the fourth gear, the fifth gear, the sixth gear, the seventh gear, and the eighth gear are formed to be equal in shape to one another. With this structure, the first gear, the second gear, the third gear, the fourth gear, the fifth gear, the sixth gear, the seventh gear, and the eighth gear are common components. It is therefore possible to reduce manufacturing costs of the first gear, the second gear, the third gear, the fourth gear, the fifth gear, the sixth gear, the seventh gear, and the eighth gear. It is also possible to facilitate components management of the first gear, the second gear, the third gear, the fourth gear, the fifth gear, the sixth gear, the seventh gear, and the eighth gear.

In at least an embodiment of the present invention, the card conveying mechanism includes an input-side gear fixed to an output shaft of the motor. Also, the power transmission mechanism includes a first idle gear engaged with the input-side gear and engaged with the first large gear part. Also, the second power transmission mechanism includes a second idle gear engaged with the input-side gear, and a third idle gear engaged with the second idle gear and engaged with the fifth large gear part. With this structure, the position where the motor is disposed in the conveying direction of the card can be adjusted using the first idle gear, the second idle gear, and the third idle gear. It is therefore possible to enhance the degree of freedom concerning the position where the motor is disposed in the conveying direction of the card. With this structure, further, the conveying roller and the second conveying roller can be rotated in the same direction through the use of the common motor.

In at least an embodiment of the present invention, the card reader further includes an IC contact block including a plurality of IC contact springs each structured to contact with an external connection terminal of an IC chip formed on the card. Also, the conveying roller is disposed on one end-side portion of the card reader in the conveying direction of the card. Also, each of the second conveying roller and the IC contact block is disposed on the other end-side portion of the card reader in the conveying direction of the card. Also, the second conveying roller and the IC contact block are located at positions displaced from each other in the first direction. With this structure, the IC contact block and the second conveying roller can be disposed so that the IC contact block and the second conveying roller do not overlap each other in the conveying direction of the card. Accordingly, the card reader can be downsized in the conveying direction of the card.

In at least an embodiment of the present invention, the card reader further includes a magnetic head structured to perform at least one of reading of magnetic data recorded in the card and recording of magnetic data to the card. Also, the magnetic head is located closer to one side of the card reader in the first direction with respect to a center of the card reader in the first direction. Also, the power transmission mechanism is located closer to the other side of the card reader in the first direction with respect to the center of the card reader in the first direction.

In at least an embodiment of the present invention, the card reader further includes an IC contact block including a plurality of IC contact springs each structured to contact with an external connection terminal of an IC chip formed on the card. Also, a center of an IC contact spring group, constituted of the plurality of IC contact springs, in the first direction is located closer to one side of the card reader in the first direction with respect to a center of the card reader in the first direction. Also, the power transmission mechanism is located closer to the other side of the card reader in the first direction with respect to the center of the card reader in the first direction.

With this structure, a wide space for installation of the power transmission mechanism can be secured at the other side, where the power transmission mechanism is disposed, in the first direction with respect to the center of the card reader in the first direction. Accordingly, a space for installation of the first gear, the second gear, the third gear, and the fourth gear can be secured even when the first gear and the third gear are rotatably supported by the first support shaft so as to overlap each other in the axial direction of the first support shaft and the second gear and the fourth gear are rotatably supported by the second support shaft so as to overlap each other in the axial direction of the second support shaft.

As described above, according to at least an embodiment of the present invention, it is possible to downsize a card reader in a conveying direction of a card to be conveyed along a card conveying passage even when a reduction ratio between a motor and a card conveying roller each structuring a card conveying mechanism is increased.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Embodiments of the present invention will be described below with reference to the accompanying drawings.

(Schematic Structure of Card Reader)

Figure 1:
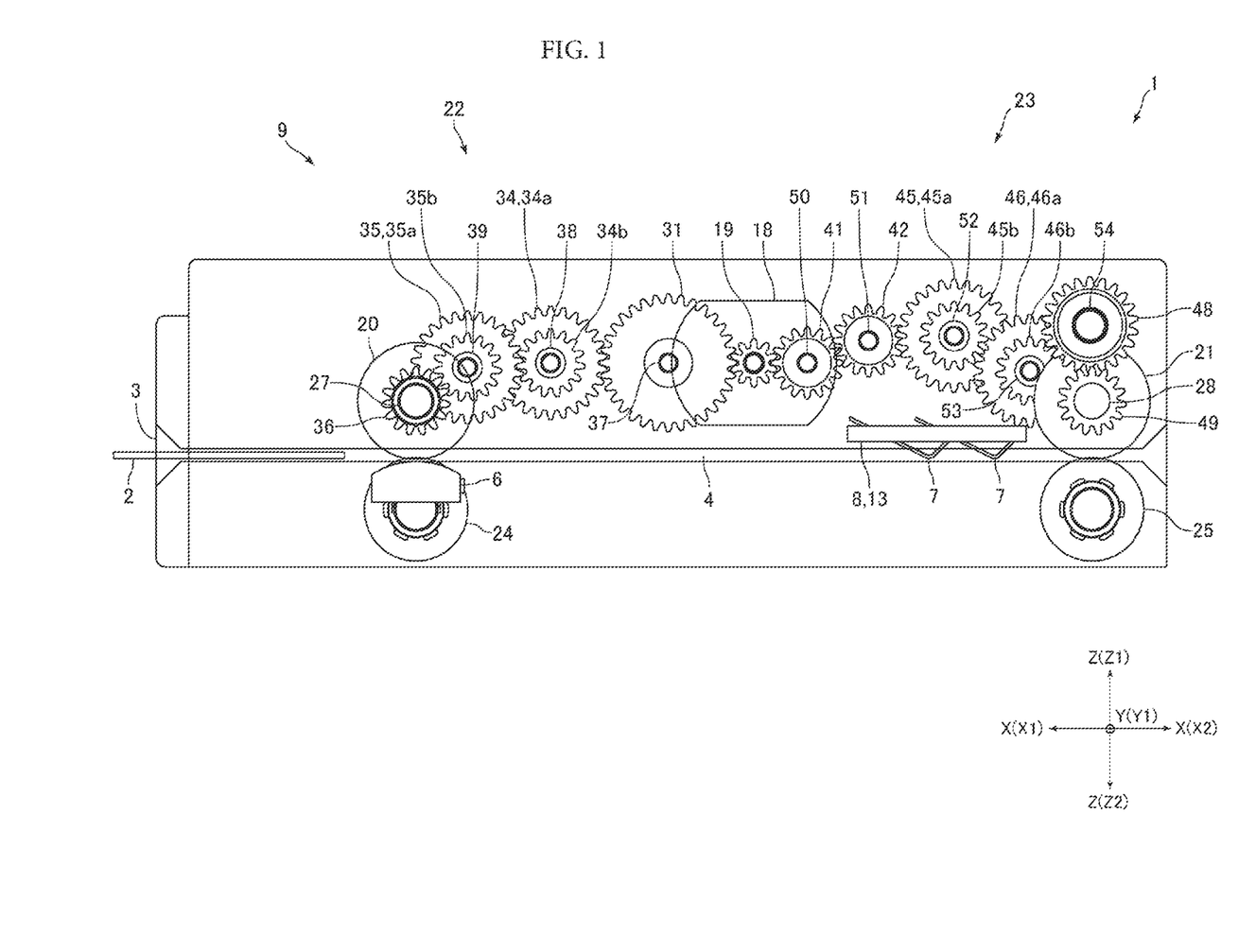
FIG. 1 is an explanatory side view showing a schematic structure of a card reader in accordance with an embodiment of the present invention.
Figure 2:
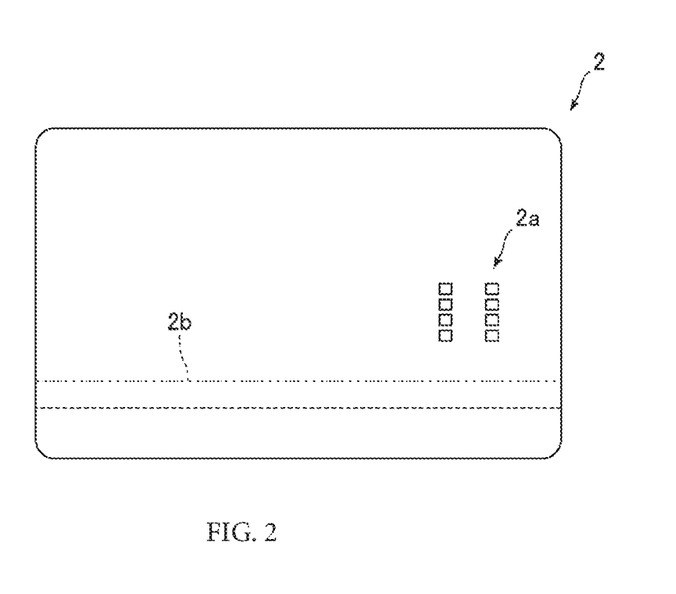
FIG. 2 is a plan view of a card shown in FIG. 1.
Figure 3:
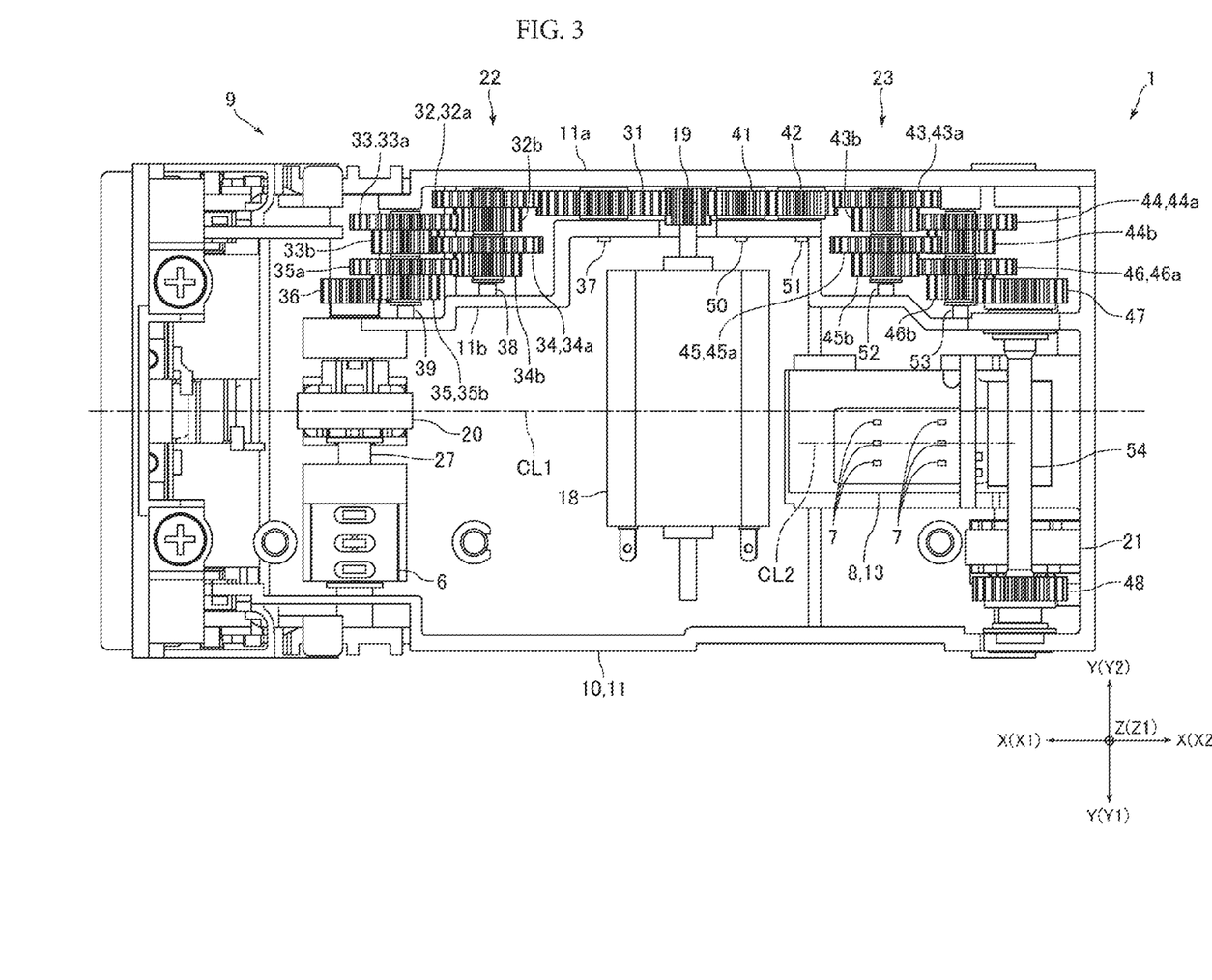
FIG. 3 is a plan view of the card reader shown in FIG. 1.

FIG. 1 is an explanatory side view showing a schematic structure of a card reader 1 in accordance with an embodiment of the present invention. FIG. 2 is a plan view of a card 2 shown in FIG. 1. FIG. 3 is a plan view of the card reader 1 shown in FIG. 1.

The card reader 1 in this embodiment is a device for performing reading of data recorded in the card 2 and recording of data to the card 2 and is mounted for use on a predetermined host apparatus such as an automated teller machine (ATM). The card reader 1 is formed with a card insertion port 3 into which the card 2 is inserted, and a card conveying passage 4 where the card 2 inserted into the card insertion port 3 is conveyed. The card conveying passage 4 is formed to be connected with the card insertion port 3.

The card 2 is a card made of vinyl chloride whose thickness is about 0.7-0.8 mm, and is formed in a substantially rectangular shape. The card 2 is incorporated with an IC chip and, as shown in FIG. 2, a front face of the card 2 is formed with an external connection terminal 2a of the IC chip. A rear face of the card 2 is formed with a magnetic stripe 2b in which magnetic data are recorded.

In the card conveying passage 4, the card 2 is conveyed in an "X" direction in FIG. 1 and the like. In other words, the "X" direction is a conveying direction of the card 2. Further, a "Z" direction in FIG. 1 and the like perpendicular to the "X" direction is a thickness direction of the card 2 conveyed along the card conveying passage 4, and a "Y" direction in FIG. 1 and the like perpendicular to the "X" direction and the "Z" direction is a width direction of the card 2 conveyed along the card conveying passage 4. In the following descriptions, the "X" direction is referred to as a "front and rear direction", the "Y" direction is referred to as a "right and left direction", and the "Z" direction is referred to as an "upper and lower direction". Further, an "X1" direction side is referred to as a "front" side, an "X2"

direction side is referred to a "rear (back)" side, a "Y1" direction side is referred to as a "right" side, a "Y2" direction side is referred to as a "left" side, a "Z1" direction side is referred to as an "upper" side, and a "Z2" direction side is referred to as a "lower" side. The right and left direction ("Y" direction) in this embodiment is a first direction.

The card reader 1 includes: a magnetic head 6 structured to perform at least one of reading of magnetic data recorded in the card 2 and recording of magnetic data to the card 2; an IC contact block 8 having a plurality of IC contact springs 7 each structured to contact with the external connection terminal 2a of the card 2; a card conveying mechanism 9 structured to convey the card 2 along the card conveying passage 4; and a main body frame 10 to which the magnetic head 6, the IC contact block 8, and the card conveying mechanism 9 are attached. The main body frame 10 includes an upper frame 11 structuring an upper side portion of the main body frame 10, and a lower frame 12 structuring a lower side portion of the main body frame 10. Each of the upper frame 11 and the lower frame 12 is made of resin.

The magnetic head 6 is disposed to face the card conveying passage 4 from the lower side. This magnetic head 6 is urged to the upper side by an urging mechanism (not shown). Further, the magnetic head 6 is disposed on a front end side portion of the card reader 1. In addition, the magnetic head 6 is located at a position where the magnetic stripe of the card 2 is passed in the right and left direction. Specifically, the magnetic head 6 is located closer to the right side relative to a center of the card reader 1 in the right and left direction. A counter roller (not shown) is disposed on an upper side of the magnetic head 6 so as to oppose the magnetic head 6. It should be noted that an alternate long and short dash line CL1 in FIG. 3 is a center line of the card reader 1 in the right and left direction as seen from the upper side.

The IC contact block 8 includes a spring holder 13 structured to hold the plurality of IC contact springs 7. The IC contact block 8 in this embodiment includes six IC contact springs 7, and the spring holder 13 is structured to hold six IC contact springs 7. The six IC contact springs 7 are held by the spring holder 13 so that three of the IC contact springs 7 are adjacent to one another in the right and left direction and the three IC contact springs 7 adjacent to one another in the right and left direction are arranged in two rows in the front and rear direction. A center of an IC contact spring group, constituted of the six IC contact springs 7, in the right and left direction is located closer to the right side relative to the center of the card reader 1 in the right and left direction. It should be noted that the IC contact block 8 may include eight IC contact springs 7. Further, an alternate long and short dash line CL2 in FIG. 3 is a center line of the IC contact spring group in the right and left direction as seen from the upper side.

The IC contact block 8 is disposed to face the card conveying passage 4 from the upper side. Further, the IC contact block 8 is disposed on a rear end side portion of the card reader 1. This IC contact block 8 is held by a parallel link mechanism (not shown) and is urged to the front upper side by the urging force of a spring member (not shown). Further, a rear end side portion of the spring holder 13 is formed with a stopper (not shown) protruded toward the lower side.

The IC contact block 8 is movable between a standby position where the IC contact springs 7 are separated upward from the card 2 located on the card conveying passage 4 and a contact position where the external connection terminal 2a of the card 2 located on the card conveying passage 4 is contacted with the IC contact springs 7. When the card 2 is further conveyed toward the rear side in a state that a rear end of the card 2 conveyed toward the rear side along the card conveying passage 4 is contacted with the stopper of the spring holder 13, the IC contact block 8 is moved downward while being guided by the parallel link mechanism so as to slide in the rear direction.

(Structure of Card Conveying Mechanism)

Figure 4:
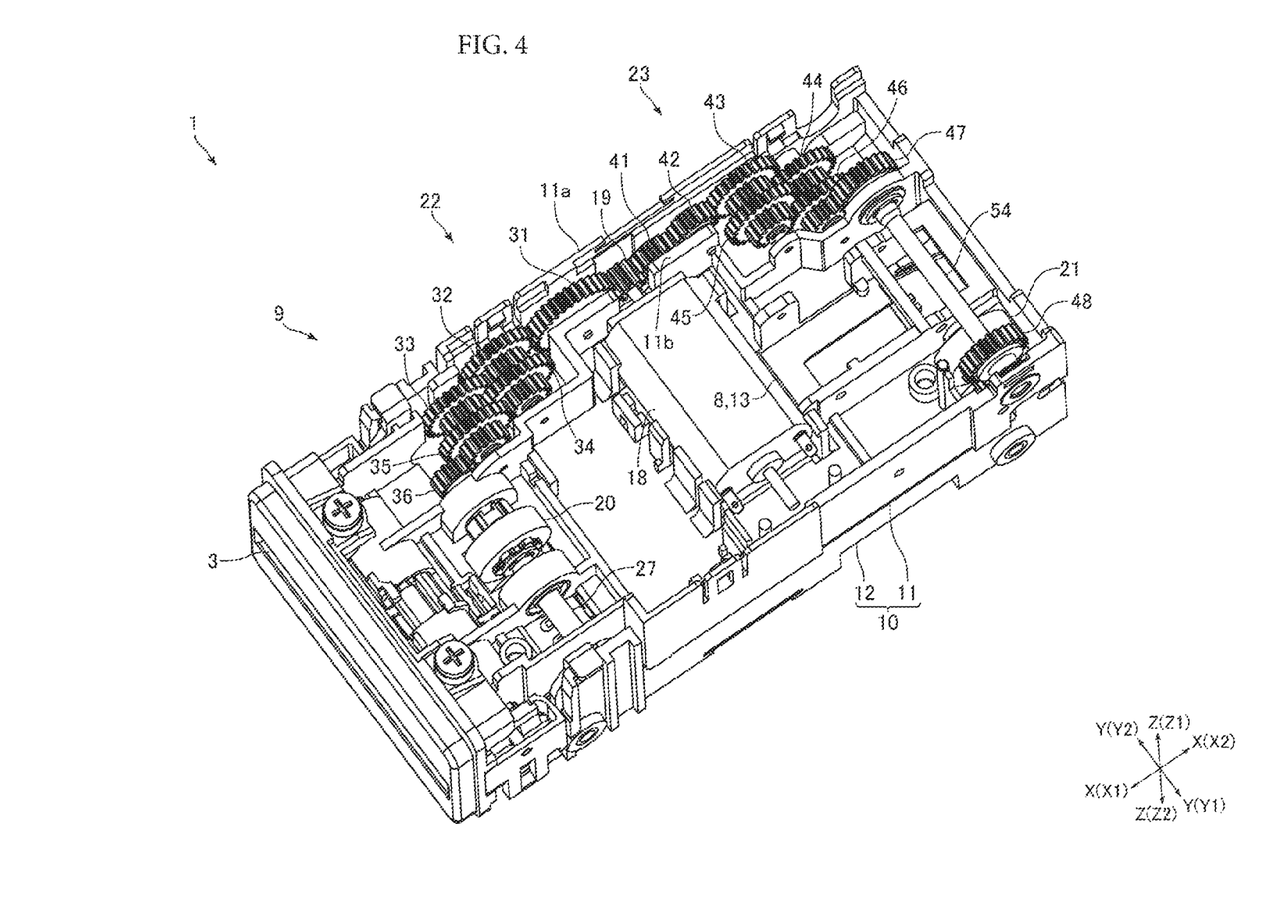
FIG. 4 is a perspective view of the card reader shown in FIG. 1.
Figure 5:
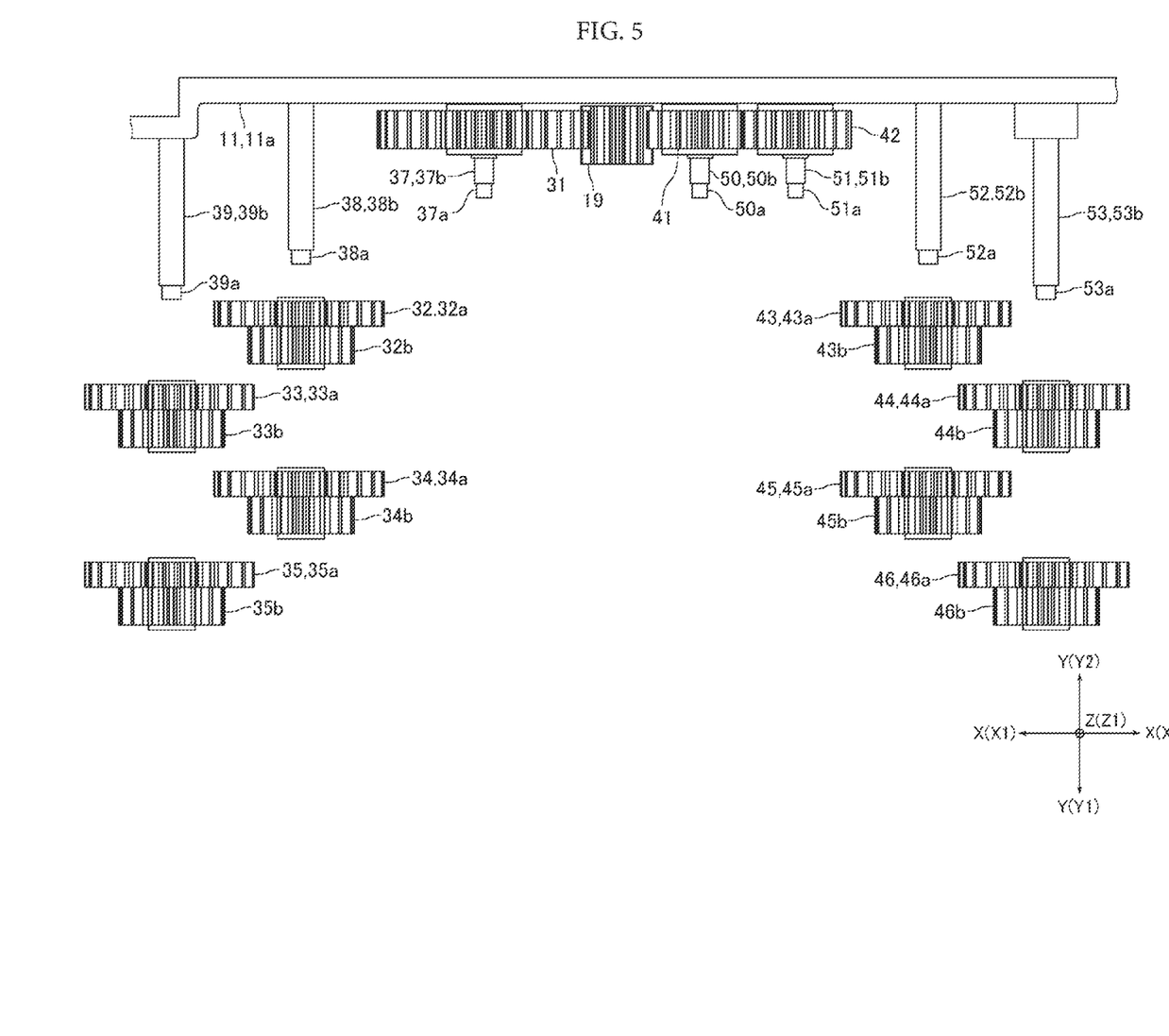
FIG. 5 is a plan view showing a state that a reduction gear shown in FIG. 3 is detached from a support shaft.
Figure 6:
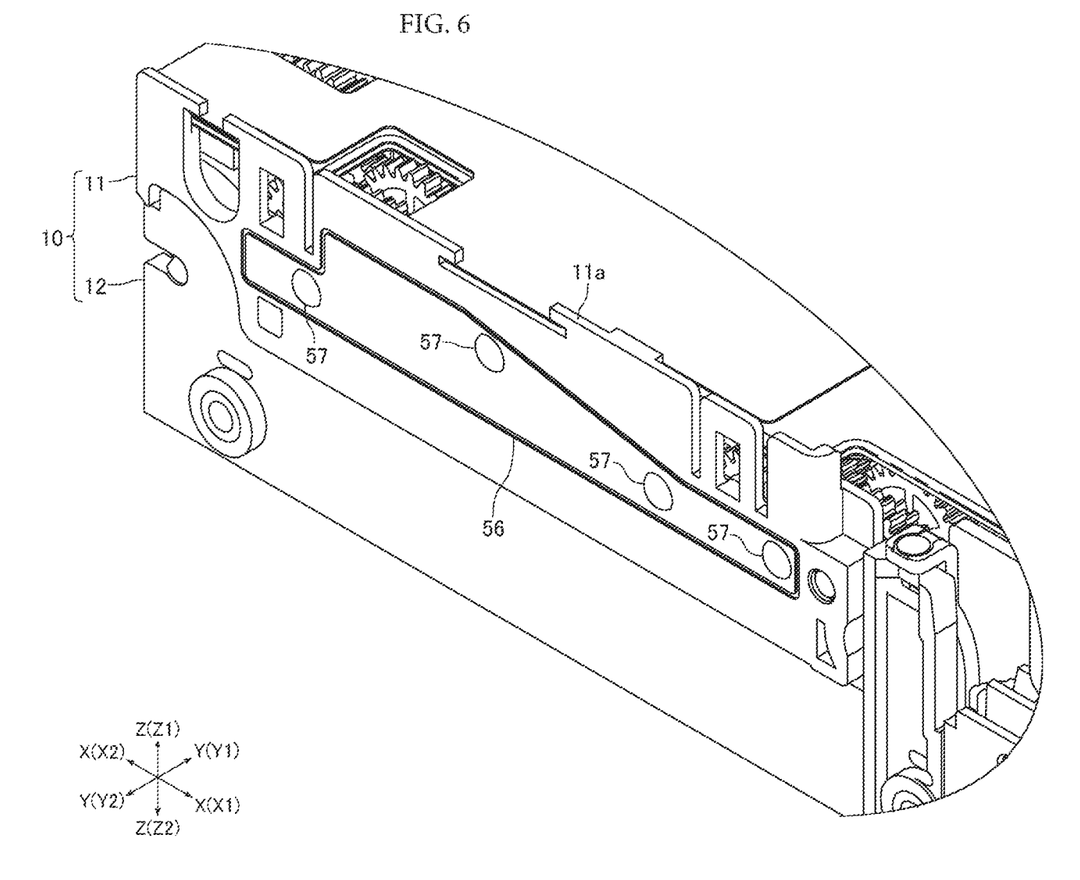
FIG. 6 is a perspective view of a part of the card reader shown in FIG. 1.
Figure 7:
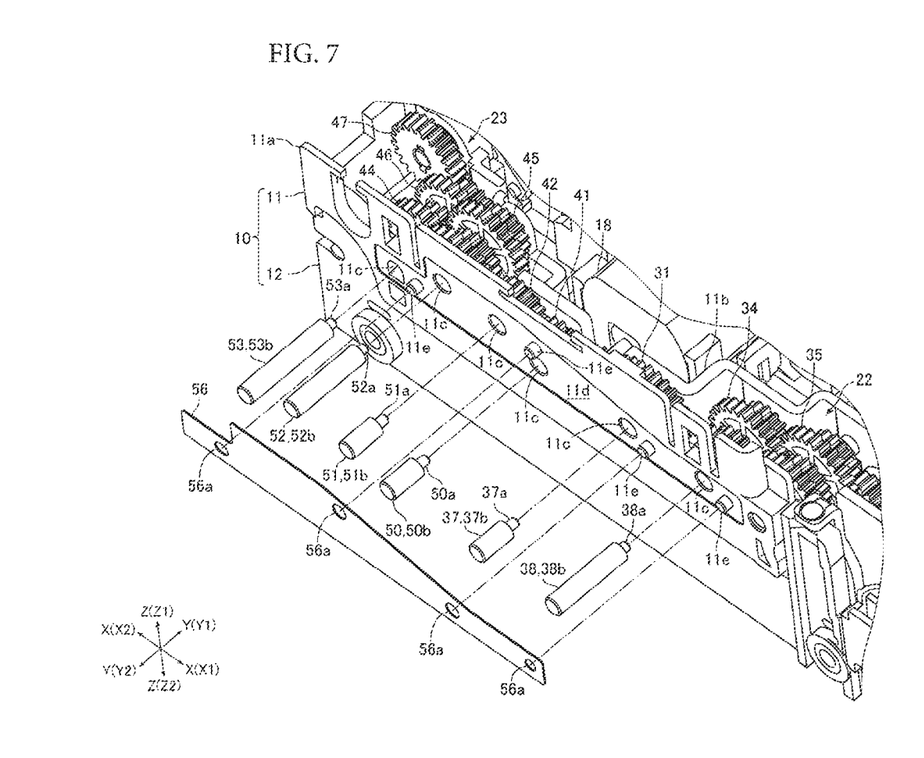
FIG. 7 is an exploded perspective view of a part of the card reader shown in FIG. 1.

FIG. 4 is a perspective view of the card reader 1 shown in FIG. 1. FIG. 5 is a plan view showing a state that gears 32 to 35 and 43 to 46 shown in FIG. 3 are detached from support shafts 38, 39, 52, and 53. FIG. 6 is a perspective view of a part of the card reader 1 shown in FIG. 1. FIG. 7 is an exploded perspective view of a part of the card reader 1 shown in FIG. 1.

The card conveying mechanism 9 includes: a motor 18 structured to serve as a drive source; a gear 19 fixed to an output shaft of the motor 18; two conveying rollers 20 and 21 structured to contact with the card 2 to convey the card 2; a power transmission mechanism 22 structured to reduce power of the motor 18 to transmit the reduced power to the conveying roller 20; a power transmission mechanism 23 structured to reduce power of the motor 18 to transmit the reduced power to the conveying roller 21; a pad roller 24 disposed to oppose the conveying roller 20; and a pad roller 25 disposed to oppose the conveying roller 21. This card conveying mechanism 9 is attached to the upper frame 11. The gear 19 in this embodiment corresponds to an input-side gear. The conveying roller 21 in this embodiment corresponds to a second conveying roller. The power transmission mechanism 23 in this embodiment corresponds to a second power transmission mechanism.

The conveying roller 20 and the pad roller 24 are disposed on the front end side portion of the card reader 1. The conveying roller 21 and the pad roller 25 are disposed on the rear end side portion of the card reader 1. In other words, the conveying roller 20 and the pad roller 24 are disposed in a separated state with a distance between the conveying roller 20 and pad roller 24 and the conveying roller 21 and pad roller 25 in the front and rear direction. The distance from the conveying roller 20 and the pad roller 24 to the conveying roller 21 and the pad roller 25 in the front and rear direction is shorter than a length of the card 2 (a length in a longitudinal direction of the card 2) and is longer than a read assurance range of magnetic data to be recorded on the magnetic stripe 2b. It should be noted that the card reader 1 in this embodiment is capable of ejecting the card 2 toward the rear side of the card reader 1, and the conveying roller 21 mainly conveys the card 2 along the card conveying passage 4 in ejecting the card 2 toward the rear side of the card reader 1.

The conveying roller 20 is a rubber roller and is structured of a rubber tire structuring an outer peripheral side portion of the conveying roller 20 and a mandrel structuring an inner peripheral side portion of the conveying roller 20. The conveying roller 20 is fixed to a rotation shaft 27. The rotation shaft 27 is rotatably supported by the upper frame 11 so that an axial direction of the rotation shaft 27 is coincided with the right and left direction. The conveying roller 20 is disposed to contact with the card 2 from the upper side. Further, the conveying roller 20 is located at a substantially center position of the card reader 1 in the right and left direction and is also located at a position substantially equal to a position of the magnetic head 6 in the front and rear direction. In other words, the conveying roller 20 is disposed to be aligned with the magnetic head 6 in the right and left direction as seen from the upper and lower direction.

In this embodiment, a center of the magnetic head 6 in the front and rear direction is substantially coincided with an axial center of the rotation shaft 27 in the front and rear direction as seen from the upper and lower direction.

The conveying roller 21 is a rubber roller formed to be equal in shape to the conveying roller 21, and is structured of a rubber tire structuring an outer peripheral side portion of the conveying roller 21 and a mandrel structuring an inner peripheral side portion of the conveying roller 21. The conveying roller 21 is fixed to a rotation shaft 28 (see FIG. 1). The rotation shaft 28 is rotatably supported by the upper frame 11 so that an axial direction of the rotation shaft 28 is coincided with the right and left direction. The conveying roller 21 is disposed to contact with the card 2 from the upper side. Further, the conveying roller 21 is disposed on a right end side portion of the card reader 1 and is located closer to the right side relative to the IC contact block 8. In other words, the conveying roller 21 and the IC contact block 8 are located at positions displaced from each other in the right and left direction. Further, the conveying roller 21 is disposed to be slightly closer to the rear side relative to the IC contact block 8 in the front and rear direction.

The pad rollers 24 and 25 are made of resin such as polyacetal. The pad roller 24 is disposed on a lower side of the conveying roller 20 so as to oppose the conveying roller 20. The pad roller 25 is disposed on a lower side of the conveying roller 21 so as to oppose the conveying roller 21. Further, the pad roller 24 is urged toward the conveying roller 20, and the pad roller 25 is urged toward the conveying roller 21. In other words, the pad rollers 24 and 25 are urged toward the upper side.

The motor 18 is disposed so that an axial direction of the output shaft of the motor 18 is coincided with the right and left direction. Further, the motor 18 is disposed on a substantially center portion of the card reader 1 in the front and rear direction. Specifically, the motor 18 is located at a substantially center position between the conveying roller 20 and the conveying roller 21 in the front and rear direction. The gear 19 is fixed to a left end side of the output shaft of the motor 18. The gear 19 is located closer to the left side relative to a main body of the motor 18. This gear 19 is disposed between the power transmission mechanism 22 and the power transmission mechanism 23 in the front and rear direction. In other words, the output shaft of the motor 18 is disposed between the power transmission mechanism 22 and the power transmission mechanism 23 in the front and rear direction.

The power transmission mechanism 22 includes: six gears 31 to 36; a support shaft 37 structured to support the gear 31 in a rotatable manner; a support shaft 38 structured to support the gears 32 and 34 in a rotatable manner; and a support shaft 39 structured to support the gears 33 and 35 in a rotatable manner. This power transmission mechanism 22 is located closer to the left side relative to the center of the card reader 1 in the right and left direction. The support shafts 37 to 39 are attached to a left end side portion of the upper frame 11 so that axial directions of the support shafts 37 to 39 are coincided with the right and left direction. Further, the support shafts 37 to 39 are arranged in this order from the rear side toward the front side in a separated state with a predetermined distance therebetween. In this embodiment, the support shaft 38 and the support shaft 39 are formed to be equal in shape to each other.

Each of the gears 32 to 35 is a reduction gear. The gear 32 is structured of a large gear part 32a having a plurality of teeth formed on an outer peripheral face of the large gear part 32a, and a small gear part 32b having a plurality of teeth formed on an outer peripheral face of the small gear part 32b and being smaller in pitch diameter than the large gear part 32a. The large gear part 32a and the small gear part 32b are coaxially disposed with each other. The gears 33 to 35 are formed to be equal in shape to the gear 32. In other words, the gear 33 is structured of a large gear part 33a equivalent to the large gear part 32a, and a small gear part 33b equivalent to the small gear part 32b. The gear 34 is structured of a large gear part 34a equivalent to the large gear part 32a, and a small gear part 34b equivalent to the small gear part 32b. The gear 35 is structured of a large gear part 35a equivalent to the large gear part 32a and a small gear part 35b equivalent to the small gear part 32b.

The gear 32 in this embodiment corresponds to a first gear. The gear 33 in this embodiment corresponds to a second gear. The gear 34 in this embodiment corresponds to a third gear. The gear 35 in this embodiment corresponds to a fourth gear. Further, the large gear part 32a in this embodiment corresponds to a first large gear part. The small gear part 32b in this embodiment corresponds to a first small gear part. The large gear part 33a in this embodiment corresponds to a second large gear part. The small gear part 33b in this embodiment corresponds to a second small gear part. The large gear part 34a in this embodiment corresponds to a third large gear part. The small gear part 34b in this embodiment corresponds to a third small gear part. The large gear part 35a in this embodiment corresponds to a fourth large gear part. The small gear part 35b in this embodiment corresponds to a fourth small gear part. Further, the support shaft 38 in this embodiment corresponds to a first support shaft. The support shaft 39 in this embodiment corresponds to a second support shaft.

The gear 32 and the gear 34 are disposed to overlap each other in the axial direction of the support shaft 38. In other words, the gear 32 and the gear 34 are rotatably supported by the support shaft 38 so as to overlap each other in the axial direction of the support shaft 38. In this embodiment, the gear 32 is located on the left side, and the gear 34 is located on the right side. Further, the gear 32 is supported by the support shaft 38 so that the large gear part 32a is located on the left side and the small gear part 32b is located on the right side. The gear 34 is supported by the support shaft 38 so that the large gear part 34a is located on the left side and the small gear part 34b is located on the right side.

The gear 33 and the gear 35 are disposed to overlap each other in the axial direction of the support shaft 39. In other words, the gear 33 and the gear 35 are rotatably supported by the support shaft 39 so as to overlap each other in the axial direction of the support shaft 39. In this embodiment, the gear 33 is located on the left side, and the gear 35 is located on the right side. Further, the gear 33 is supported by the support shaft 39 so that the large gear part 33a is located on the left side and the small gear part 33b is located on the right side. The gear 35 is supported by the support shaft 39 so that the large gear part 35a is located on the left side and the small gear part 35b is located on the right side.

The gear 31 is engaged with the gear 19. Further, the gear 31 is engaged with the large gear part 32a. The gear 31 functions as an idle gear for adjusting a distance between an axial center of the gear 19 and an axial center of the gear 32. The small gear part 32b is engaged with the large gear part 33a. Further, the small gear part 33b is engaged with the large gear part 34a, and the small gear part 34b is engaged with the large gear part 35a. The gear 36 is fixed to a left end side portion of the rotation shaft 27. The gear 36 is engaged with the small gear part 35b. The gear 31 in this embodiment corresponds to a first idle gear. It should be noted that no speed reduction is made between the gear 36 and the small gear part 35b.

The power transmission mechanism 23 includes: nine gears 41 to 49; a support shaft 50 structured to support the gear 41 in a rotatable manner; a support shaft 51 structured to support the gear 42 in a rotatable manner; a support shaft 52 structured to support the gears 43 and 45 in a rotatable manner; a support shaft 53 structured to support the gears 44 and 46 in a rotatable manner; and a rotation shaft 54 to which the gears 47 and 48 are fixed. This power transmission mechanism 23 is located closer to the left side relative to the center of the card reader 1 in the right and left direction. A reduction ratio of the power transmission mechanism 23 is equal to a reduction ratio of the power transmission mechanism 22. Further, the power transmission mechanisms 22 and 23 are disposed between the conveying roller 20 and the conveying roller 21 in the front and rear direction.

The support shafts 50 to 53 are attached to the left end side portion of the upper frame 11 so that axial directions of the support shafts 50 to 53 are coincided with the right and left direction. Further, the support shafts 50 to 53 are arranged in this order from the front side toward the rear side in a separated state with a predetermined distance therebetween. In this embodiment, the support shaft 50 and the support shaft 51 are formed to be equal in shape to each other. Further, the support shafts 50 and 51 are formed to be equal in shape to the support shaft 37. The support shaft 52 and the support shaft 53 are formed to be equal in shape to each other. Further, the support shafts 52 and 53 are formed to be equal in shape to the support shafts 38 and 39. The rotation shaft 54 is rotatably supported by the upper frame 11 so that an axial direction of the rotation shaft 54 is coincided with the right and left direction. This rotation shaft 54 is located immediately above the rotation shaft 28.

Each of the gears 43 to 46 is a reduction gear. The gears 43 to 46 are formed to be equal in shape to the gear 32. In other words, the gear 43 is structured of a large gear part 43a equivalent to the large gear part 32a, and a small gear part 43b equivalent to the small gear part 32b. The gear 44 is structured of a large gear part 44a equivalent to the large gear part 32a, and a small gear part 44b equivalent to the small gear part 32b. The gear 45 is structured of a large gear part 45a equivalent to the large gear part 32a, and a small gear part 45b equivalent to the small gear part 32b. The gear 46 is structured of a large gear part 46a equivalent to the large gear part 32a, and a small gear part 46b equivalent to the small gear part 32b.

The gear 43 in this embodiment corresponds to a fifth gear. The gear 44 in this embodiment corresponds to a sixth gear. The gear 45 in this embodiment corresponds to a seventh gear. The gear 46 in this embodiment corresponds to an eighth gear. Further, the large gear part 43a in this embodiment corresponds to a fifth large gear part. The small gear part 43b in this embodiment corresponds to a fifth small gear part. The large gear part 44a in this embodiment corresponds to a sixth large gear part. The small gear part 44b in this embodiment corresponds to a sixth small gear part. The large gear part 45a in this embodiment corresponds to a seventh large gear part. The small gear part 45b in this embodiment corresponds to a seventh small gear part. The large gear part 46a in this embodiment corresponds to an eighth large gear part. The small gear part 46b in this embodiment corresponds to an eighth small gear part. Further, the support shaft 52 in this embodiment corresponds to a third support shaft. The support shaft 53 in this embodiment corresponds to a fourth support shaft.

The gear 43 and the gear 45 are disposed to overlap each other in the axial direction of the support shaft 52. In other words, the gear 43 and the gear 45 are rotatably supported by the support shaft 52 so as to overlap each other in the axial direction of the support shaft 52. In this embodiment, the gear 43 is located on the left side, and the gear 45 is located on the right side. Further, the gear 43 is supported by the support shaft 52 so that the large gear part 43a is located on the left side and the small gear part 43b is located on the right side. The gear 45 is supported by the support shaft 52 so that the large gear part 45a is located on the left side and the small gear part 45b is located on the right side.

The gear 44 and the gear 46 are disposed to overlap each other in the axial direction of the support shaft 53. In other words, the gear 44 and the gear 46 are rotatably supported by the support shaft 53 so as to overlap each other in the axial direction of the support shaft 53. In this embodiment, the gear 44 is located on the left side, and the gear 46 is located on the right side. Further, the gear 44 is supported by the support shaft 53 so that the large gear part 44a is located on the left side and the small gear part 44b is located on the right side. The gear 46 is supported by the support shaft 53 so that the large gear part 46a is located on the left side and the small gear part 46b is located on the right side.

The gear 41 is engaged with the gear 19. Further, the gear 41 is engaged with the gear 42. The gear 42 is engaged with the large gear part 43a. Each of the gears 41 and 42 functions as an idle gear for adjusting a distance between the axial center of the gear 19 and an axial center of the gear 43 and for adjusting a rotation direction of the gear 43. The small gear part 43b is engaged with the large gear part 44a. Further, the small gear part 44b is engaged with the large gear part 45a, and the small gear part 45b is engaged with the large gear part 46a. The gear 47 is fixed to a left end side portion of the rotation shaft 54. The gear 47 is engaged with the small gear part 46b. The gear 48 is fixed to a right end side portion of the rotation shaft 54. The gear 49 is fixed to a right end side portion of the rotation shaft 28. This gear 49 is located closer to the right side relative to the conveying roller 21. The gear 48 and the gear 49 are engaged with each other. The gear 41 in this embodiment corresponds to a second idle gear. The gear 42 in this embodiment corresponds to a third idle gear. It should be noted that no speed reduction is made between the gear 49 and the small gear part 46b.

As described above, the support shafts 37 to 39 and 50 to 53 are attached to the left end side portion of the upper frame 11. Each of the support shafts 37 to 39 and 50 to 53 is a stepped shaft. Specifically, right end portions of the support shafts 37 to 39 and 50 to 53 are smaller in diameter than the other portions of the support shafts 37 to 39 and 50 to 53. In other words, the support shafts 37 to 39 and 50 to 53 are stepped shafts respectively having small diameter parts 37a, 38a, 39a, 50a, 51a, 52a, and 53a located on right end sides of the support shafts 37 to 39 and 50 to 53, and large diameter parts 37b, 38b, 39b, 50b, 51b, 52b, and 53b larger in outer diameter than the small diameter parts 37a to 39a and 50a to 53a.

Left end sides of the support shafts 37 to 39 and 50 to 53 are supported by a left side face portion 11a structuring a left side face of the upper frame 11. The right end sides of the support shafts 37 to 39 and 50 to 53 are supported by a shaft support portion 11b formed on the upper frame 11. The left side face portion 11a is formed with through-holes 11c in which the left end side portions of the support shafts 37, 38, and 50 to 53 (i.e., the left end side portions of the large diameter parts 37b, 38b, and 50b to 53b) are disposed (see FIG. 7). The shaft support portion 11b is formed with through-holes in which the small diameter parts 37a to 39a and 50a to 53a are disposed. These through-holes have inner diameters smaller than outer diameters of the large diameter parts 37b to 39b and 50b to 53b.

The support shafts 37 to 39 and 50 to 53 have stepped faces located between the small diameter parts 37a to 39a and 50a to 53a and the large diameter parts 37b to 39b and 50b to 53b. The respective stepped faces oppose a left side face of the shaft support portion 11b. Therefore, the stepped faces prevent the support shafts 37 to 39 and 50 to 53 from coming off in the right direction. A retaining member 56 is fixed to the left side face portion 11a to prevent the support shafts 37, 38, and 50 to 53 from coming off in the left direction. The retaining member 56 is a thin plate made of metal. The retaining member 56 is disposed to cover left end faces of the support shafts 37, 38, and 50 to 53. The left end faces of the support shafts 37, 38, and 50 to 53 oppose a right side face of the retaining member 56.

The left side face of the left side face portion 11a is formed with a recess 11d in which the retaining member 56 is disposed. A recessed amount of the recess 11d is almost equal to the thickness of the retaining member 56. Therefore, the retaining member 56 does not protrude from the left side face of the left side face portion 11a toward the left side. Further, the recess 11d before the retaining member 56 is disposed therein and fixed thereto is formed with a plurality of projections 11e protruding in the left direction, as shown in FIG. 7. The retaining member 56 is formed with a plurality of through-holes 56a into which the projections 11e are respectively inserted. The through-holes 56a have inner diameters almost equal to outer diameters of the projections 11e.

In assembling the card reader 1, the support shafts 37, 38, and 50 to 53 are respectively inserted into the through-holes 11c from the left side of the left side face portion 11a. Thereafter, the retaining member 56 is disposed in the recess 11d so that the projections 11e are respectively inserted into the through-holes 56a. The position of the retaining member 56 is set when the projections 11e are respectively inserted into the through-holes 56a. Thereafter, the retaining member 56 is fixed to the left side face portion 11a in such a manner that heat is applied to the projections 11e to melt the projections 11e. In other words, the retaining member 56 is fixed by welding to the left side face portion 11a. As a result, a side face of the retaining member 56, which has been fixed to the left side face portion 11a, is formed with a plurality of welding marks 57 as shown in FIG. 6.

It should be noted that in this embodiment, the support shaft 39 is prevented from coming off in the left direction by an E-type snap ring (not shown) attached to a left end side of the support shaft 39, owing to circumstances such as the shape of the left side face portion 11a and space. Alternatively, the support shaft 39 may be prevented from coming off in the left direction by the retaining member 56. Further, the retaining member 56 may be fixed by adhesion to the left side face portion 11a or may be fixed to the left side face portion 11a with a screw or a push nut. Further, the retaining member 56 may be made of resin. However, the retaining member 56 is made of metal in consideration of the durability since the support shafts 37, 38, and 50 to 53 may rotate together with the gears 31, 32, 34, and 41 to 46. Further, the support shafts 37 to 39 and 50 to 53 are not necessarily structured of stepped shafts as long as the shaft support portion 11b is formed with a retaining portion for preventing the support shafts 37 to 39 and 50 to 53 from coming off in the right direction.

In the card conveying mechanism 9 structured as described above, when the motor 18 rotates, power of the motor 18 is transmitted to the conveying roller 20 via the power transmission mechanism 22 and is also transmitted to the conveying roller 21 via the power transmission mechanism 23. The power of the motor 18 causes the conveying rollers 20 and 21 to rotate in the same direction at the same rotational speed.

(Principal Effects in this Embodiment)

In this embodiment, as described above, the support shafts 38 and 39 are disposed so that the axial directions of the support shafts 38 and 39 are coincided with the right and left direction. Further, the gears 32 and 34 are rotatably supported by the support shaft 38 so as to overlap each other in the axial direction of the support shaft 38. The gears 33 and 35 are rotatably supported by the support shaft 39 so as to overlap each other in the axial direction of the support shaft 39. In this embodiment, therefore, the four reduction gears 32 to 35 can be disposed using the two support shafts 38 and 39 disposed with a predetermined distance therebetween in the front and rear direction. In this embodiment, in other words, the number of reduction gears 32 to 35 can be increased even when the number of support shafts 38 and 39 structured to support the reduction gears 32 to 35 is two. Also in this embodiment, since the number of reduction gears 32 to 35 can be increased, a reduction ratio between the motor 18 and the conveying roller 20 can be increased even when the pitch diameter of each of the large gear parts 32a to 35a is decreased.

In this embodiment, likewise, the support shafts 52 and 53 are disposed so that the axial directions of the support shafts 52 and 53 are coincided with the right and left direction. The gears 43 and 45 are rotatably supported by the support shaft 52 so as to overlap each other in the axial direction of the support shaft 52. The gears 44 and 46 are rotatably supported by the support shaft 53 so as to overlap each other in the axial direction of the support shaft 53. Therefore, the number of reduction gears 43 to 46 can be increased even when the number of support shafts 52 and 53 structured to support the reduction gears 43 to 46 is two. Further, a reduction ratio between the motor 18 and the conveying roller 21 can be increased even when the pitch diameter of each of the large gear parts 43a to 46a is decreased.

In this embodiment, as described above, the reduction ratio between the motor 18 and the conveying roller 20 can be increased even when the number of support shafts 38 and 39 disposed with a predetermined distance therebetween in the front and rear direction is two and even when the pitch diameter of each of the large gear parts 32a to 35a is decreased. Further, the reduction ratio between the motor 18 and the conveying roller 21 can be increased even when the number of support shafts 52 and 53 disposed in a predetermined distance therebetween in the front and rear direction is two and even when the pitch diameter of each of the large gear parts 43a to 46a is decreased. In this embodiment, accordingly, the card reader 1 can be downsized in the front and rear direction even when the reduction ratio between the motor 18 and the conveying roller 20 and the reduction ratio between the motor 18 and the conveying roller 21 are increased.

In this embodiment, the output shaft of the motor 18 is disposed between the power transmission mechanism 22 and the power transmission mechanism 23 in the front and rear direction. In this embodiment, therefore, the card reader 1 can be downsized in the front and rear direction even when the card conveying mechanism 9 includes the two power transmission mechanisms 22 and 23. Also in this embodiment, the conveying roller 21 and the IC contact block 8 are located at the positions displaced from each other in the right and left direction. Further, the conveying roller 21 and the IC contact block 8 do not overlap each other in the front and rear direction. In this embodiment, therefore, the card reader 1 can be downsized in the front and rear direction as compared with a case where the conveying roller 21 and the IC contact block 8 overlap each other in the front and rear direction.

In this embodiment, the power transmission mechanisms 22 and 23 are located closer to the left side relative to the center of the card reader 1 in the right and left direction. On the other hand, the magnetic head 6 is located closer to the right side relative to the center of the card reader 1 in the right and left direction. Further, the center of the IC contact spring group, which is constituted of the six IC contact springs 7, in the right and left direction is also located closer to the right side relative to the center of the card reader 1 in the right and left direction. In this embodiment, therefore, a wide space for installation of the power transmission mechanisms 22 and 23 can be secured at the left end side portion, where the power transmission mechanisms 22 and 23 are disposed, of the card reader 1. In this embodiment, accordingly, a space for installation of the gears 32 to 35 and 43 to 46 can be secured even when the gears 32 and 34 are rotatably supported by the support shaft 38 so as to overlap each other in the axial direction of the support shaft 38, the gears 33 and 35 are rotatably supported by the support shaft 39 so as to overlap each other in the axial direction of the support shaft 39, the gears 43 and 45 are rotatably supported by the support shaft 52 so as to overlap each other in the axial direction of the support shaft 52, and the gears 44 and 46 are rotatably supported by the support shaft 53 so as to overlap each other in the axial direction of the support shaft 53.

In this embodiment, the gears 32 to 35 and the gears 43 to 46 are formed to be equal in shape with one another. Further, the gears 32 to 35 and 43 to 46 are common components. In this embodiment, therefore, it is possible to reduce manufacturing costs of the gears 32 to 35 and 43 to 46 and to facilitate components management of the gears 32 to 35 and 43 to 46. Also in this embodiment, the power transmission mechanism 22 includes the gear 31 functioning as an idle gear, and the power transmission mechanism 23 includes the gears 41 and 42 each functioning as an idle gear. Therefore, the position where the motor 18 is located in the front and rear direction can be adjusted using the gears 31, 41, and 42. In this embodiment, accordingly, it is possible to enhance the degree of freedom concerning the position where the motor 18 is located in the front and rear direction.

In this embodiment, the support shafts 37, 38, and 50 to 53 are prevented from coming off in the left direction by the retaining member 56 formed in a thin plate shape. In this embodiment, therefore, it is unnecessary to form, on the left end sides of the support shafts 37, 38, and 50 to 53, mount portions for attaching, for example, E-type snap rings preventing the support shafts 37, 38, and 50 to 53 from coming off in the left direction. In this embodiment, accordingly, it is possible to reduce processing costs of the support shafts 37, 38, and 50 to 53. Also in this embodiment, it is possible to downsize the card reader 1 since it is unnecessary to provide a space for disposing, for example, E-type snap rings preventing the support shafts 37, 38, and 50 to 53 from coming off in the left direction. Also in this embodiment, the six support shafts 37, 38, and 50 to 53 are prevented from coming off in the left direction by fixing the one retaining member 56. Therefore, it is possible to facilitate work of assembling the card reader 1 as compared with a case where an E-type snap ring or the like is attached to each of the six support shafts 37, 38, and 50 to 53.

(Other Embodiments)

Described above is an example of a preferred embodiment according to the present invention. However, the present invention is not limited to the above embodiment and various variations and modifications may be made without changing the concept of the present invention.

In the embodiment described above, the two gears 32 and 34 are supported by the support shaft 38, and the two gears 33 and 35 are supported by the support shaft 39. Alternatively, the number of gears to be supported by the support shafts 38 and 39 may be not less than three. In the embodiment described above, likewise, the two gears 43 and 45 are supported by the support shaft 52, and the two gears 44 and 46 are supported by the support shaft 53. Alternatively, the number of gears to be supported by the support shafts 52 and 53 may be not less than three.

In the embodiment described above, the power transmission mechanism 22 includes the two support shafts 38 and 39, that is, the support shaft 38 structured to support the plurality of reduction gears 32 and 34 and the support shaft 39 structured to support the plurality of reduction gears 33 and 35. Alternatively, the power transmission mechanism 22 may include three or more support shafts each structured to support a plurality of reduction gears. In the embodiment described above, likewise, the power transmission mechanism 23 includes the two support shafts 52 and 53, that is, the support shaft 52 structured to support the plurality of reduction gears 43 and 45 and the support shaft 53 structured to support the plurality of reduction gears 44 and 46. Alternatively, the power transmission mechanism 23 may include three or more support shafts each structured to support a plurality of reduction gears.

In the embodiment described above, the gears 32 to 35 and the gears 43 to 46 are formed to be equal in shape to one another. However, the present invention is not limited to this embodiment. For example, some of the gears 32 to 35 and 43 to 46 may be different in shape from the remaining gears as long as the gears 32 to 35 and 43 to 46 have the large gear parts 32a to 35a and 43a to 46a, and the small gear parts 32b to 35b and 43b to 46b.

In the embodiment described above, the gear 31 is provided between the gear 19 and the gear 32. Alternatively, the gear 19 may be engaged with the large gear part 32a of the gear 32. In this case, the gear 41 or the gear 42 becomes unnecessary. Also in the embodiment described above, the power transmission mechanism 23 is located closer to the left side relative to the center of the card reader 1 in the right and left direction. Alternatively, the power transmission mechanism 23 may be located closer to the right side relative to the center of the card reader 1 in the right and left direction. Also in the embodiment described above, the card conveying mechanism 9 includes the conveying roller 21. Alternatively, the card conveying mechanism 9 does not necessarily include the conveying roller 21. In this case, the power transmission mechanism 23 becomes unnecessary.

In the embodiment described above, the support shafts 37, 38, and 50 to 53 are prevented from coming off in the left direction by the retaining member 56 formed in a thin plate shape. Alternatively, the support shafts 37, 38, and 50 to 53 may be prevented from coming off in the left direction by, for example, E-type snap rings to be respectively attached to the left end sides of the support shafts 37, 38, and 50 to 53. Also in the embodiment described above, the support shafts 37 to 39 and 50 to 53 are prevented from coming off in the right direction by the stepped faces of the support shafts 37 to 39 and 50 to 53, the stepped faces being located between the small diameter parts 37a to 39a and 50a to 53a and the large diameter parts 37b to 39b and 50b to 53b. Alternatively, the support shafts 37 to 39 and 50 to 53 may be prevented from coming off in the right direction by, for example, E-type snap rings to be respectively attached to the right end sides of the support shafts 37 to 39 and 50 to 53.

In the embodiment described above, the card reader 1 includes the magnetic head 6. Alternatively, the card reader 1 does not necessarily include the magnetic head 6. Also in the embodiment described above, the card reader 1 includes the IC contact block 8. Alternatively, the card reader 1 does not necessarily include the IC contact block 8. Also in the embodiment described above, the card 2 is a card made of vinyl chloride whose thickness is about 0.7-0.8 mm. Alternatively, the card 2 may be a PET (polyethylene terephthalate) card whose thickness is about 0.18-0.36 mm and may be a paper card having a predetermined thickness.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A card reader comprising for use with a card, the card reader comprising:
   a card conveying passage; and
   a card conveying mechanism structured to convey the card along the card conveying passage,
   wherein
   the card conveying mechanism-comprises:
      a motor structured to serve as a drive source;
      a conveying roller structured to contact with the card to convey the card; and
      a power transmission mechanism structured to reduce power of the motor to transmit the reduced power to the conveying roller,
   the power transmission mechanism-comprises:
      a first gear comprising a first large gear part, and a first small gear part that is smaller in pitch diameter than the first large gear part and is coaxially disposed with the first large gear part;
      a second gear comprising a second large gear part that is larger in pitch diameter than the first small gear part and is engaged with the first small gear part, and a second small gear part that is smaller in pitch diameter than the second large gear part and is coaxially disposed with the second large gear part;
      a third gear comprising a third large gear part that is larger in pitch diameter than the second small gear part and is engaged with the second small gear part, and a third small gear part that is smaller in pitch diameter than the third large gear part and is coaxially disposed with the third large gear part;
      a fourth gear comprising a fourth large gear part that is larger in pitch diameter than the third small gear part and is engaged with the third small gear part, and a fourth small gear part that is smaller in pitch diameter than the fourth large gear part and is coaxially disposed with the fourth large gear part;
      a first support shaft structured to support the first gear and the third gear in a rotatable manner; and
      a second support shaft structured to support the second gear and the fourth gear in a rotatable manner, and
   when a direction perpendicular to a thickness direction of the card to be conveyed along the card conveying passage and a conveying direction of the card is referred to as a first direction,
   the first support shaft is disposed so that an axial direction of the first support shaft is coincided with the first direction, and the second support shaft is disposed so that an axial direction of the second support shaft is coincided with the first direction, and
   the first gear and the third gear are disposed to overlap each other in the axial direction of the first support shaft, and the second gear and the fourth gear are disposed to overlap each other in the axial direction of the second support shaft.

2. The card reader according to claim 1, wherein the first gear, the second gear, the third gear, and the fourth gear are formed to be equal in shape to one another.

3. The card reader according to claim 1, wherein the card conveying mechanism comprises an input-side gear fixed to an output shaft of the motor, and the power transmission mechanism comprises a first idle gear engaged with the input-side gear and engaged with the first large gear part.

4. The card reader according to claim 1, wherein the card conveying mechanism comprises:
   a second conveying roller disposed in a separated state with a distance between the second conveying roller and the conveying roller in the conveying direction of the card, and structured to contact with the card to convey the card; and
   a second power transmission mechanism structured to reduce power of the motor to transmit the reduced power to the second conveying roller, and
   the motor has an output shaft disposed between the power transmission mechanism and the second power transmission mechanism in the conveying direction of the card.

5. The card reader according to claim 4, wherein the second power transmission mechanism comprises:
   a fifth gear comprising a fifth large gear part, and a fifth small gear part that is smaller in pitch diameter than the fifth large gear part and is coaxially disposed with the fifth large gear part;
   a sixth gear comprising a sixth large gear part that is larger in pitch diameter than the fifth small gear part and is engaged with the fifth small gear part, and a sixth small gear part that is smaller in pitch diameter than the sixth large gear part and is coaxially disposed with the sixth large gear part;
   a seventh gear comprising a seventh large gear part that is larger in pitch diameter than the sixth small gear part and is engaged with the sixth small gear part, and a seventh small gear part that is smaller in pitch diameter than the seventh large gear part and is coaxially disposed with the seventh large gear part;
   an eighth gear comprising an eighth large gear part that is larger in pitch diameter than the seventh small gear part and is engaged with the seventh small gear part, and an eighth small gear part that is smaller in pitch diameter than the eighth large gear part and is coaxially disposed with the eighth large gear part;

a third support shaft structured to support the fifth gear and the seventh gear in a rotatable manner; and a fourth support shaft structured to support the sixth gear and the eighth gear in a rotatable manner, the third support shaft is disposed so that an axial direction of the third support shaft is coincided with the first direction, and the fourth support shaft is disposed so that an axial direction of the fourth support shaft is coincided with the first direction, and the fifth gear and the seventh gear are disposed to overlap each other in the axial direction of the third support shaft, and the sixth gear and the eighth gear are disposed to overlap each other in the axial direction of the fourth support shaft.

6. The card reader according to claim 5, wherein the first gear, the second gear, the third gear, the fourth gear, the fifth gear, the sixth gear, the seventh gear, and the eighth gear are formed to be equal in shape to one another.

7. The card reader according to claim 5, wherein the card conveying mechanism comprises an input-side gear fixed to an output shaft of the motor, the power transmission mechanism includes a first idle gear engaged with the input-side gear and engaged with the first large gear part, and the second power transmission mechanism includes a second idle gear engaged with the input-side gear, and a third idle gear engaged with the second idle gear and engaged with the fifth large gear part.

8. The card reader according to claim 4, further comprising an IC contact block comprising a plurality of IC contact springs each structured to contact with an external connection terminal of an IC chip formed on the card, wherein the conveying roller is disposed on one end-side portion of the card reader in the conveying direction of the card, each of the second conveying roller and the IC contact block is disposed on the other end-side portion of the card reader in the conveying direction of the card, and the second conveying roller and the IC contact block are located at positions displaced from each other in the first direction.

9. The card reader according to claim 1, further comprising a magnetic head structured to perform at least one of reading of magnetic data recorded in the card and recording of magnetic data to the card, wherein the magnetic head is located closer to one side of the card reader in the first direction with respect to a center of the card reader in the first direction, and the power transmission mechanism is located closer to the other side of the card reader in the first direction with respect to the center of the card reader in the first direction.

10. The card reader according to claim 1, further comprising an IC contact block comprising a plurality of IC contact springs each structured to contact with an external connection terminal of an IC chip formed on the card, wherein a center of an IC contact spring group, comprising the plurality of IC contact springs, in the first direction is located closer to one side of the card reader in the first direction with respect to a center of the card reader in the first direction, and the power transmission mechanism is located closer to the other side of the card reader in the first direction with respect to the center of the card reader in the first direction.

\* \* \* \* \*